Aug. 4, 1925.
C. Z. GRIMES
1,548,681
MILK PAIL HOLDER
Filed Nov. 5, 1923
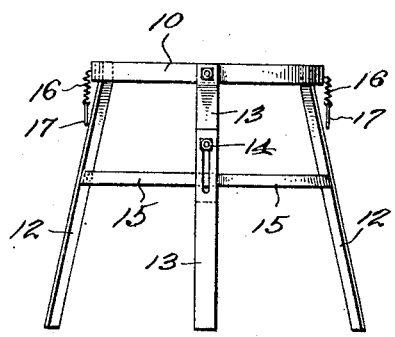
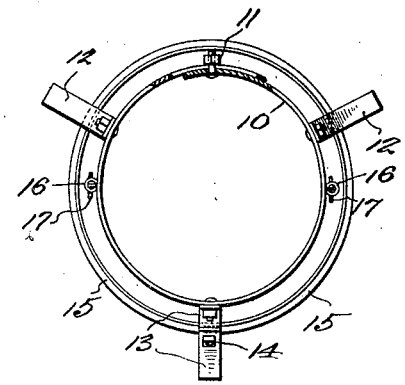
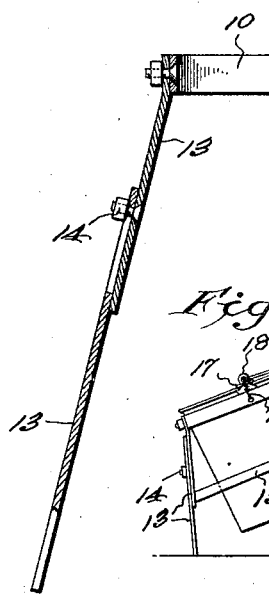
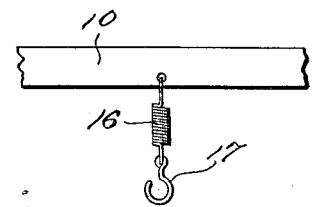
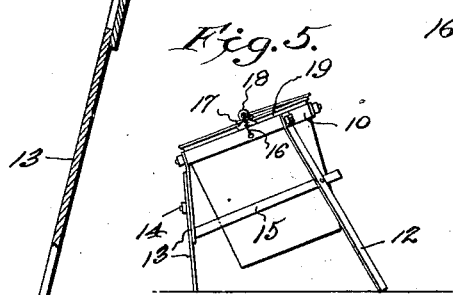
Charles Z. Grimes,
INVENTOR
BY Victor J. Evans
ATTORNEY
WITNESSES.

Patented Aug. 4, 1925.

1,548,681

UNITED STATES PATENT OFFICE.

CHARLES Z. GRIMES, OF CHAMBERS, NEBRASKA.

MILK-PAIL HOLDER.

Application filed November 5, 1923. Serial No. 672,993.

*To all whom it may concern:*

Be it known that I, CHARLES Z. GRIMES, a citizen of the United States, residing at Chambers, in the county of Holt and State of Nebraska, have invented new and useful Improvements in Milk-Pail Holders, of which the following is a specification.

This invention relates to improvements in milk pail holders and has for an object the provision of a holder which may be detachably secured to a pail for conveniently carrying the pail and holder.

Another object of the invention is the provision of securing means as above set forth which may engage the bail ears of the pail, so that the device may be used in connection with both closed and opened pails.

Another object of the invention is the provision of a pail holder which is adjustable for pails of different sizes and is also adjustable to regulate the inclination of the pail, so that the latter may be positioned to catch the milk without danger of catching dirt dropped from the cow's body or udder.

With the above and other objects in view, the invention further includes the following novel features and details of construction, to be hereinafter more fully described, illustrated in the accompanying drawings and pointed out in the appended claim.

In the drawings:—

Figure 1 is a side elevation of a pail holder constructed in accordance with the invention.

Figure 2 is a top plan view.

Figure 3 is a vertical sectional view.

Figure 4 is a view of one of the bail ear clips.

Figure 5 is a side elevation of the invention showing the adjustable leg shortened and showing the pail therein.

Referring to the drawings in detail, wherein like characters of reference denote corresponding parts, the improved holder is shown as comprising a frame 10 which is formed of a ring or band whose ends are adjustably connected as shown at 11 to provide means for regulating its diameter. Extending from the frame 10 are legs 12 of equal length, while a sectional leg 13 also extends from the frame 10. The sections of the leg 13 are adjustably connected as at 14 so that the length of the leg may be regulated, the purpose being to adjust the said leg to a shorter length than the length of the legs 12 so that the frame may be horizontally tilted to a desired angle. The legs 12 and 13 are connected by braces 15.

Secured to the frame 10 by means of springs 16 are clips 17. These clips are so formed as to engage over the bail attaching ears 18 of a pail 19 when the latter is placed within the frame. This provides means for securing the pail within the holder, whether the pail is opened or closed.

By adjusting the leg 13 so as to provide proper inclination to the frame 10, the pail may be so positioned as to prevent dirt or extraneous matter dropping from the cow into the pail and at the same time conveniently locate the pail for receiving the milk.

The invention is susceptible of various changes in its form, proportions and minor details of construction and the right is herein reserved to make such changes as properly fall within the scope of the appended claim.

Having described my invention, what I claim is:—

A pail holder embodying an adjustable pail receiving frame, retractile spring hooks secured to the frame to engage the bail ears of the pail, a pair of legs secured to the frame, a circular brace secured to the legs below the frame and an adjustable sectional leg secured to the frame and brace whereby a desired tilt of the pail and holder may be regulated.

In testimony whereof I affix my signature.

CHARLES Z. GRIMES.